(12) United States Patent
Brunvoll

(10) Patent No.: US 6,939,039 B2
(45) Date of Patent: Sep. 6, 2005

(54) MEDICAL THERMOMETER AND METHOD FOR PRODUCING MEDICAL THERMOMETER

(75) Inventor: Morten Brunvoll, Berneck (CH)

(73) Assignee: Microlife Intellectual Property GmbH, Heerbrugg (CH)

( * ) Notice: Subject to any disclaimer, the term of this patent is extended or adjusted under 35 U.S.C. 154(b) by 0 days.

(21) Appl. No.: 10/333,928

(22) PCT Filed: Aug. 11, 2001

(86) PCT No.: PCT/EP01/09302

§ 371 (c)(1),
(2), (4) Date: Feb. 4, 2003

(87) PCT Pub. No.: WO02/16899

PCT Pub. Date: Feb. 28, 2002

(65) Prior Publication Data

US 2004/0101029 A1 May 27, 2004

(30) Foreign Application Priority Data

Aug. 23, 2000 (EP) .......................................... 00810750

(51) Int. Cl.⁷ ............................. G01K 1/06; G01K 7/00
(52) U.S. Cl. ....................... 374/208; 374/163; 374/183
(58) Field of Search ............................... 374/208, 163, 374/100, 183; 600/549; D10/57

(56) References Cited

U.S. PATENT DOCUMENTS

| | | | | |
|---|---|---|---|---|
| 4,138,889 | A | * | 2/1979 | Fraschini ..................... 374/160 |
| 4,158,966 | A | * | 6/1979 | Beckman ..................... 374/190 |
| 4,729,672 | A | | 3/1988 | Takagi |
| 4,743,120 | A | * | 5/1988 | Bowen ........................ 374/147 |
| 5,133,606 | A | * | 7/1992 | Zaragoza et al. ........... 374/208 |
| 5,165,798 | A | * | 11/1992 | Watanabe ................... 374/208 |
| 5,829,878 | A | | 11/1998 | Weiss |
| 6,068,399 | A | | 5/2000 | Tseng |
| 6,164,469 | A | * | 12/2000 | Sartore ...................... 215/12.1 |
| 6,386,757 | B1 | * | 5/2002 | Konno ........................ 374/158 |
| 6,580,662 | B2 | * | 6/2003 | Vassallo ...................... 368/11 |
| 6,637,935 | B2 | * | 10/2003 | Chen .......................... 374/185 |
| 6,854,880 | B2 | * | 2/2005 | Hsieh ......................... 374/163 |
| 2002/0009121 | A1 | * | 1/2002 | Siu ............................ 374/155 |

FOREIGN PATENT DOCUMENTS

| | | | | |
|---|---|---|---|---|
| EP | 0088672 A1 | * | 9/1983 | ............. A61J/1/00 |
| EP | 0171769 | | 2/1986 | |
| FR | 2526280 | | 11/1983 | |
| FR | 2767656 | | 3/1999 | |
| GB | 2148010 A | * | 5/1985 | ............. G01K/7/00 |
| GB | 2262168 | | 6/1993 | |
| JP | 356079926 A | * | 6/1981 | ............... 374/170 |
| JP | 360056230 A | * | 4/1985 | ............... 374/100 |
| JP | 60-214230 | | 10/1985 | |
| JP | 61-47526 | | 3/1986 | |
| JP | 02111512 | | 4/1990 | |
| JP | 3-102230 | | 4/1991 | |
| JP | 5-118929 | | 5/1993 | |
| JP | 07027626 | | 1/1995 | |
| JP | 08009012 | | 1/1996 | |
| JP | 10048060 | | 2/1998 | |
| JP | 10221176 | | 8/1998 | |
| JP | 10221177 | | 8/1998 | |
| WO | WO 92/16821 | | 10/1992 | |

OTHER PUBLICATIONS

Patent Abstracts of Japan vol. 1998, No. 13, Nov. 30, 1998 (cited on ISR, copies not provided).

* cited by examiner

*Primary Examiner*—Gail Verbitsky
(74) *Attorney, Agent, or Firm*—Shoemaker and Mattare

(57) ABSTRACT

A electronic medical thermometer (1) comprises a maincase (2) which is made substantially of transparent material. The main-case thermometer (1) has a display element (6) for displaying the temperature and the maincase (2) has a display area (7) through which the display element can be observed. The maincase (2) further has an additional transparent or translucent area (8), through which an interior member such as a subcase (17) or the decorative sheet (27) are provided with a colored or patterned surface.

12 Claims, 6 Drawing Sheets

MEDICAL THERMOMETER AND METHOD FOR PRODUCING MEDICAL THERMOMETER

Figure 1:
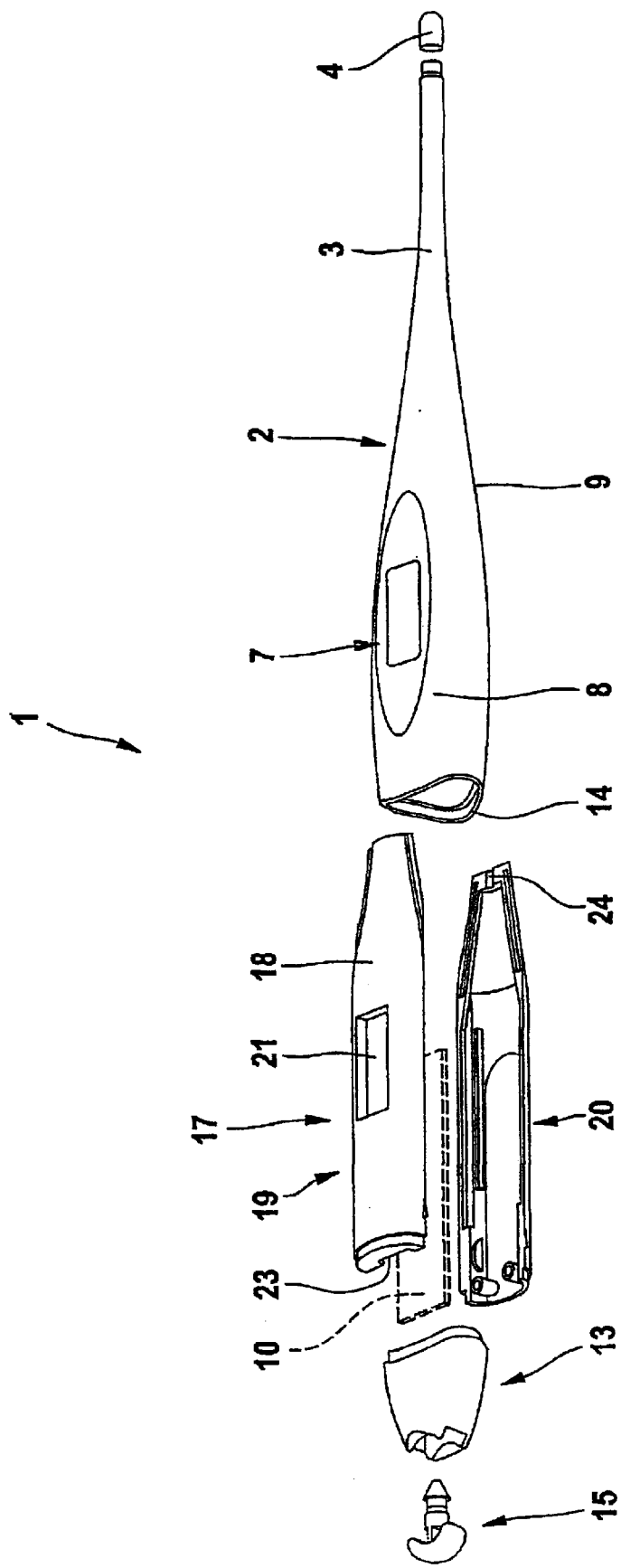

The invention relates to an electronic medical thermometer and to a method for producing such a thermometer according to the preamble of the independent patent claims.

Electronic medical thermometers are widely known and used. Usually, such thermometers consist of a housing made of plastic material with a viewing window. An integrated electronic circuit with a LCD display is arranged behind said window, so that temperature values displayed on the display can be seen. In the German utility model DEGM 298 20206 it has been proposed to use a housing which is made of transparent material and which is opacified on areas besides the viewing window. This thermometer allows easy manufacturing while electronic parts which may be unattractive to the user are hidden by the opacified portions of the housing.

Japanese document JP 10-221176A proposes an electronic medical thermometer having a sheathing case formed of a transparent resin and an indicating part and a switch which are formed in an unified body with resin. A disadvantage of this design is, that between the window and the outer case, problems with respect to density may arise.

Electronic medical thermometers today are not expensive and often, e.g. in families, each person has a personal thermometer. It is therefore preferred to have a variety of medical thermometers having different designs or colours. Differently coloured or designed thermometers are also preferred in order to attract a potential customer's view.

It is a drawback of known manufacturing techniques that it is not possible to manufacture a variety of thermometers with different designs in an economic manner.

It is therefore an object of the present invention to provide an electronic medical thermometer which may be economically manufactured and which at the same time allows to produce a variety of thermometers having different designs, e.g. colours or patterns. It is a further object of the invention to provide a method for economically producing such a thermometer.

It is a further object of the present invention to provide a thermometer which can be easily adapted to consumer's design preferences.

The above objects are solved with an electronic medical thermometer and a method for producing such a thermometer according to the characterising portion of the independent patent claims.

The thermometer comprises a maincase which has an elongated probe portion with a tip. A temperature sensor is arranged in a known manner within the tip, which is made typically of a conducting material such as metal. The thermometer further comprises a display element, typically a LCD display for displaying the temperature which is measured by the temperature sensor.

Within the maincase, there is arranged an interior decorative member. The maincase has a transparent display area forming a viewing window. The display element is arranged behind said display area. According to the present invention, the maincase has at least one additional transparent or translucent area. The interior decorative member is arranged in such a way behind the additional transparent or translucent area that at least especially a coloured, structured or patterned part of its surface is visible through the additional transparent or translucent area. This construction allows to make one standard maincase for a variety of thermometers with different designs. Different design effects may be achieved by providing differently coloured, patterned and/or structured interior members. The maincase may be completely or partly transparent or translucent. A completely transparent maincase will be most easy to manufacture and will give visible access to the interior member.

An additional translucent area will lead to a thermometer where the coloured parts of the interior member appear somewhat milky. Of course, the display area remains transparent in the case of a translucent additional area.

In a first preferred embodiment, the interior decorative member is formed as a subcase. The surface of the subcase may be provided with different colours or patterns. With this embodiment, a variety of thermometers having different appearances may be made by providing one single type of maincase and a variety of differently coloured/patterned subcases.

Because the maincase has an additional transparent or translucent area, the colours or patterns of the subcase will be seen through the maincase.

In a preferred embodiment, the subcase according to the first embodiment is carrying the display element. The subcase may be formed as a hollow body carrying an electronic circuit board connected to the temperature sensor and to the display element. The circuit board calculates the temperature based on a measurement signal provided by the temperature sensor.

The subcase can be particularly easily manufactured when it is composed of an upper part and of a lower part which are connected to each other and which form a hollow cavity in which the electronic circuit board is arranged.

The subcase may be provided with an opening for a wire connecting the temperature sensor with the circuit board and/or with an opening for an electric contact to a power supply, e.g. a battery.

In further preferred embodiment, the decorative interior member is provided with a viewing opening. The display element is visible through said opening. As the decorative member is included in the maincase, it is not necessary to provide a physical window in this opening. The viewing opening is simply formed by a hole.

This design leads to a plurality of advantages: as the maincase is closed as such, there are no problems in view of density against water or in view of removing dirt and bacteria from gaps which may be formed between a housing and integrated windows.

The subcase at the same time is used to protect and cover the electronic parts of the thermometer and to hold and position these parts within the maincase. The LCD display can be seen through the transparent maincasing and the opening in the subcase without the need of additional, inserted windows. Finally, according to customer's preferences, differently designed thermometers can be easily provided by selecting the subcase with a specifically coloured, structured or patterned surface.

The maincase preferably is closed with a closure member which is connected to an open end of the main casing. The closure member may also be transparent. Within the closure member, there is preferably arranged a power supply, e.g. a battery. A battery may be positioned in a case having a similar surface colour or structure as the subcase.

The interior decorative member is preferably arranged so that it contacts at least partly the inner surface of the maincase. This arrangement gives a coloured or patterned appearance to the transparent maincase.

In a second embodiment of the present invention, the interior decorative member is formed as a decorative sheet which is arranged between the maincase and an integrated circuit which carries the display element. The decorative sheet may be coloured or patterned in any desired way. The maincase and the integrated circuit will be identical for all thermometers, while a variety of decorative sheets allows to produce a variety of thermometers having different appearances.

The thermometer according to the invention is especially easy to produce. In a method according to the present invention, in first step, a substantially transparent maincase is provided. The maincase has a substantially closed surface, an elongated probe portion with a tip and an open end opposite said elongated probe portion.

In a second step, a decorative interior member is inserted into the maincase. The open end of the maincases is finally closed with a closing member. The closing member can be welded, e.g. an ultrasonically welded to the maincase, such that there are no problems in view of density.

There are different ways to connect the temperature sensor arranged within the tip to the electronic circuit board. In a most preferred way, a wire is attached to the circuit board before it is inserted into the subcase. The wire is pushed through the elongated probe portion and through an open and of said probe portion when the subcase is inserted into the maincase. The length of the wire is arranged in such a way that it extends over the open end of the elongated probe portion. Once the subcase is inserted, the temperature sensor is attached to the wire, fixed in a tip and the tip is attached to the open end of the elongated probe portion.

When a thermometer according to the second embodiment is produced, a decorative sheet is inserted between the subcase and the maincase.

Figure 2:
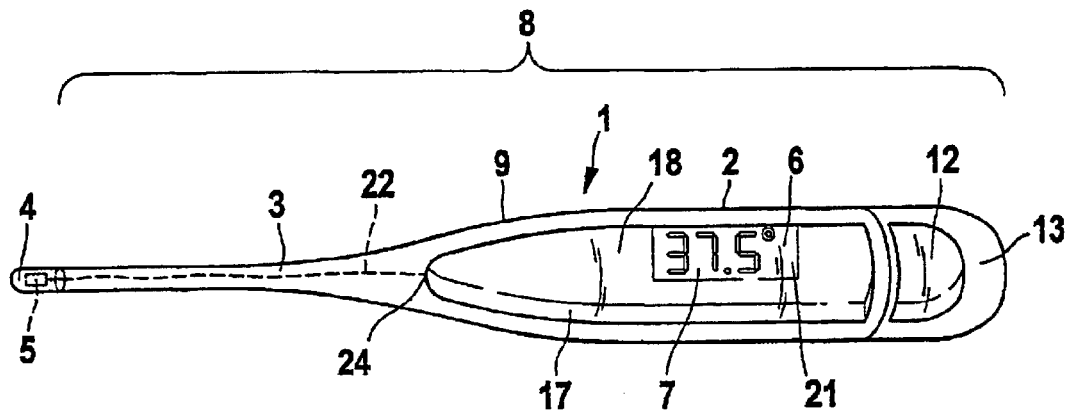
Figure 3:
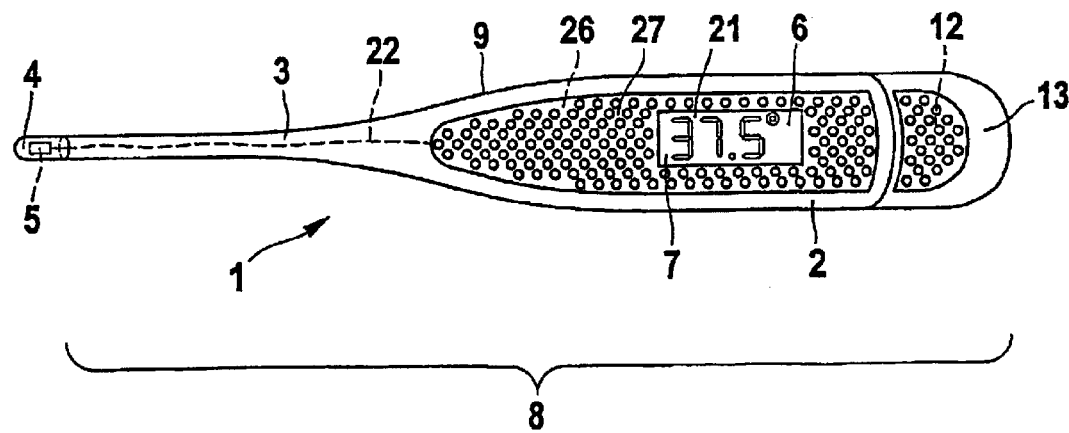
Figure 4:
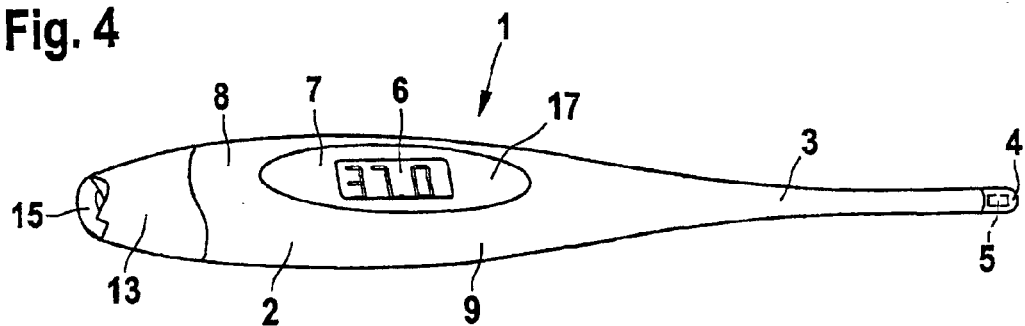
Figure 5:
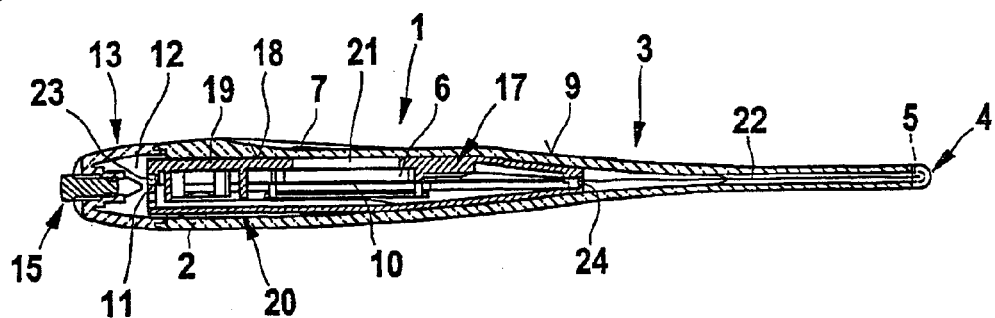
Figure 6:
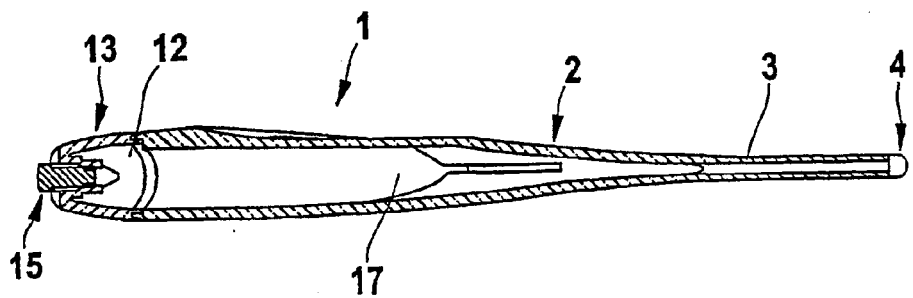
Figure 7:
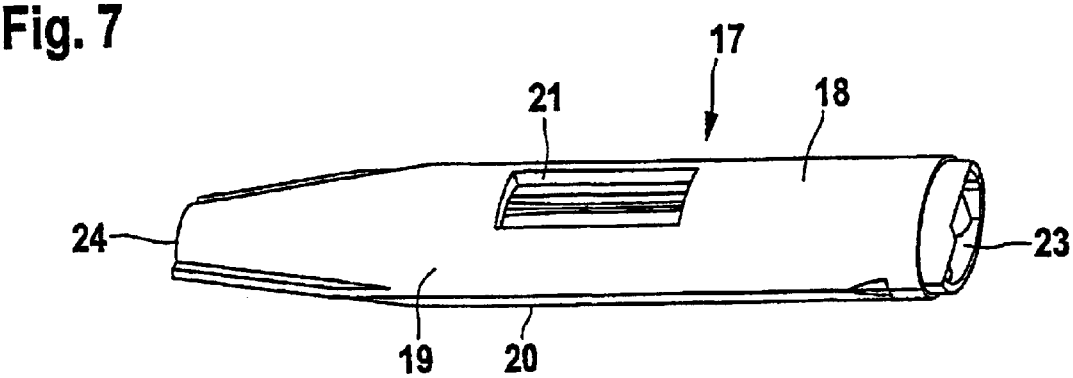
Figure 8:
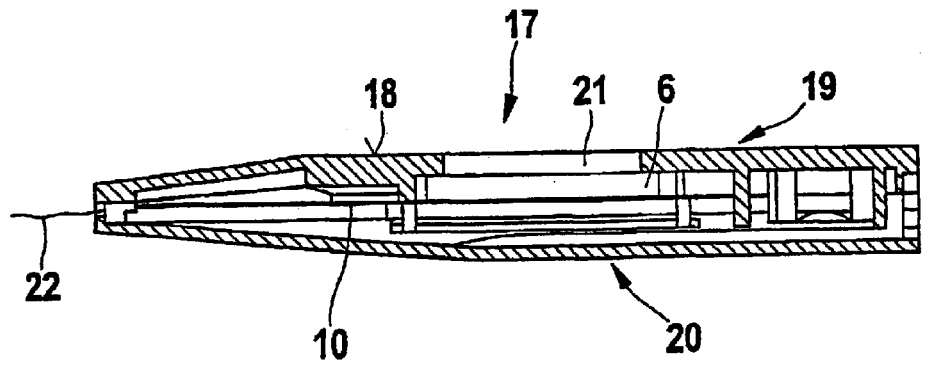
Figure 9:
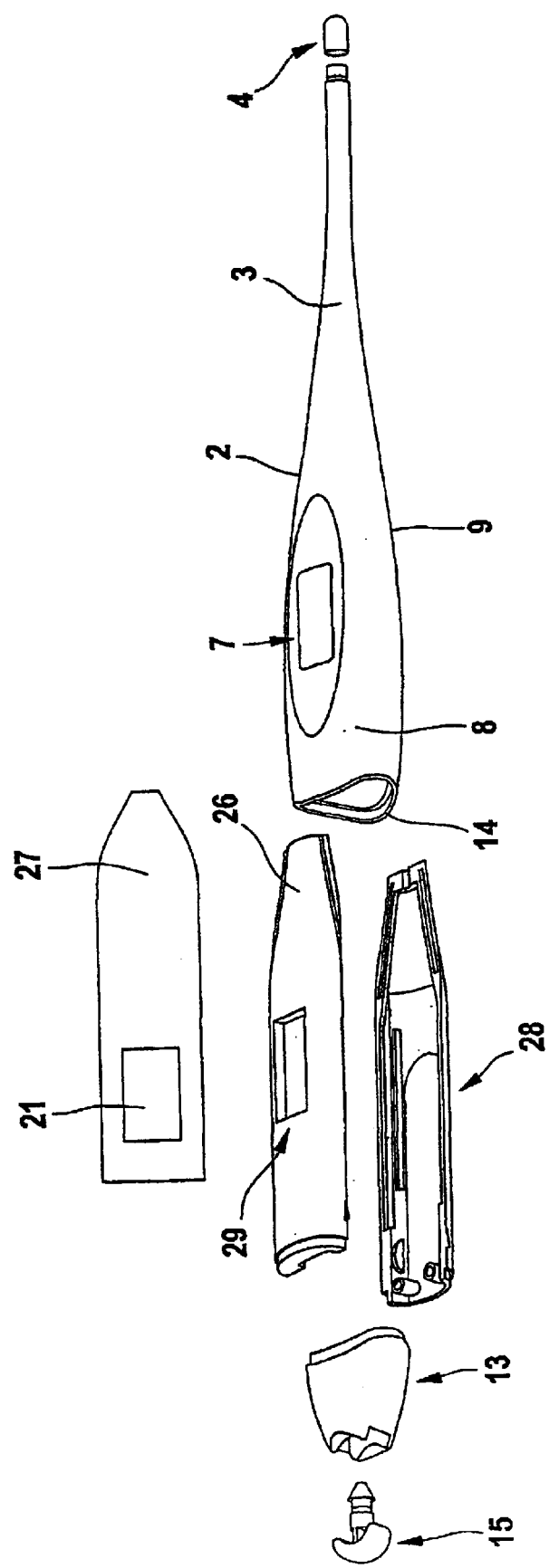
Figure 10:
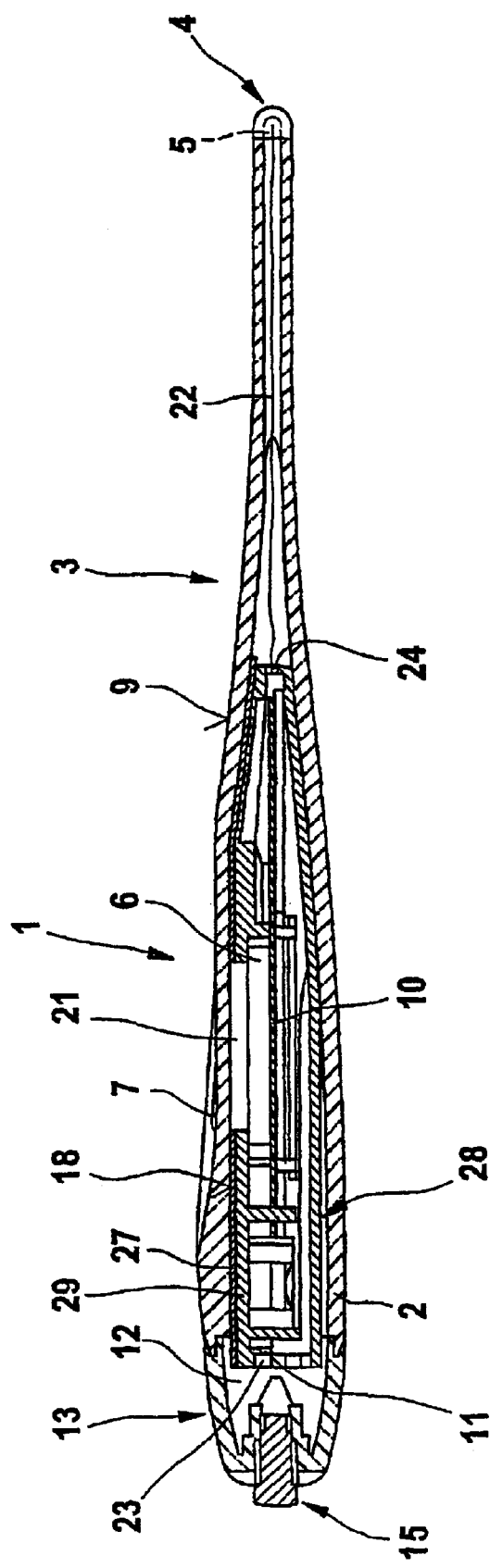

The invention will be more clearly understood with reference to the following drawings which show two embodiments of the invention:

FIG. 1 shows an exploded view of the first embodiment of the invention,

FIG. 2 shows a schematic view of the thermometer according to the first embodiment of the invention, FIG. 3 shows a schematic view of a thermometer according to the second embodiment of the invention, FIG. 4 shows a perspective view of the thermometer according to the first embodiment of the invention, FIG. 5 shows a cross sectional view through a thermometer of the first embodiment of the invention, FIG. 6 shows a cross sectional view through the maincase of the first embodiment of the invention, FIG. 7 shows a perspective view of a subcase according to the invention, FIG. 8 shows a cross sectional view through the subcase of FIG. 7, FIG. 9 shows an exploded view of a thermometer according to the second embodiment of the invention and FIG. 10 shows a cross sectional view through a thermometer according the second embodiment of the invention.

FIG. 1 shows a thermometer in an exploded view. The thermometer 1 comprises a maincase 2 having a probe portion 3 with a tip 4. A temperature sensor 5 (see FIG. 2) is arranged in tip 4. The maincase is provided with a transparent display area 7. A display element 6 arranged behind the display area 7 (see FIG. 2 to 4) can be seen through the transparent display area 7.

According to the invention, the maincase 2 is provided with an additional transparent area 8. According to the embodiment shown in FIG. 1, the maincase 2 is integrally formed from a plastic material. The maincase 2 forms a hollow body having a closed surface 9 which is transparent over the entire surface 9. The plastic material is typically ABS.

A subcase 17 forming an interior decorative member is inserted into the maincase 2. The subcase 17 is formed of an upper part 19 and a lower part 20. A printed circuit board 10 (only schematically shown in FIG. 1) is held between the upper part 19 and lower part 20. The printed circuit board 10 is provided with a LCD display element 6 (not visible in FIG. 1). The display element 6 is visible through a viewing opening 21 in the upper part 19 of the subcase 17. The surface 18 of the subcase 17 is made in a colour, e.g. yellow. The subcase typically is also made of ABS.

The maincase 2 has an open end 14, through which the subcase 17 can be inserted. The open end 14 is closed with a closure member 13. The closure member 13 is also made of a transparent material. A battery 12 (not shown in FIG. 1) may be included in the closure members 13.

The subcase 17 is provided with an opening 23 for an electric contact 11 (not shown in FIG. 1) for connecting the printed circuit board 10 to the battery 12. The subcase is provided with a second opening 24 for a wire 22 (not shown in FIG. 1) for connecting the temperature sensor 5 to the printed circuit board 10.

The closure member 13 and the tip 4 are ultrasonically welded to the maincase 2. It is also conceivable to glue the parts to each other. A switch 15 is attached to the closure member 13 which allows to turn on or off the thermometer 1.

FIG. 2 shows a perspective view of the thermometer 1 of the first embodiment. The maincase 2 is entirely formed of transparent material, whereby a transparent area 8 extending along the entire length of the thermometer 1 is formed. The subcase 17 therefore can be seen through the maincase 2. The subcase 17 is coloured, e.g. has a yellow surface. The maincase 2 is completely transparent. It is also conceivable to provide a slightly coloured but still transparent maincase. Attractive colour effects can be achieved by e.g. a slightly blue transparent maincase 2. A wire 22 connects the printed circuit board 10 to the temperature sensor 5.

FIG. 3 shows a second embodiment of the invention. An interior decorative member in the form of a coloured sheet 27 is inserted between the maincase 2 and a subcase 26 carrying a printed circuit board with a display element 6. The subcase 26 is not visible in FIG. 3 as it is covered by the sheet 27. A display element is visible through a viewing opening 21 in the sheet 27.

FIG. 4 shows another perspective view of the thermometer 1, where the visible subcase 17 has been omitted. The maincase 2 has a completely closed outer surface, so that no additional windows for the display area have to be inserted.

FIG. 5 shows a cross sectional view of the thermometer according to FIG. 1.

The upper part 19 and the lower part 20 of the subcase 17 enclose a printed circuit board 10. The upper part 19 and the lower part 20 are connected to each other by a snapping action. It is also conceivable to weld or glue the parts together. The display element 6 on the printed circuit board 10 is arranged below the opening 21 in the upper part 19 of the subcase 17. As the maincase 20 is transparent, the display element 6 can be seen through the display area 7 in the maincase and the opening 21 in the subcase 17. A wire 22 is guided through an opening 24 in the subcase 17. An electric contact 11 is provided in an opening 23 of the subcase 17 for connecting the printed circuit board 10 to a battery 12 arranged in the closure member 13.

The outer surface of the subcase 18 is designed in such a manner that the subcase is firmly held within the maincase. The surface 18 of the subcase 17 contacts the inner surface of the maincase 2.

FIG. 6 shows a cross sectional view of the thermometer 1, where only the outer shape of the subcase 17 is shown.

FIG. 7 shows a perspective view of the subcase 17. The subcase 17 consists of an upper part 19 and lower part 20. The opening 21 for the display element 6 is formed as a hole in the upper part 17. The surface 18 of the subcase 17 is coloured. It is also conceivable to provide the surface 18 of the subcase 17 with a pattern and/or with drawings which are attractive to children.

FIG. 8 shows a cross sectional view of the subcase 17. The circuit board 10 is held between the upper part 19 and the lower part 20 of the subcase.

FIG. 9 shows an exploded view of the second embodiment of the invention. A decorative sheet 27 is inserted between the subcase 26 and the maincase 2. The subcase 26 is constructed in a similar way as the subcase of the first embodiment. Due to the decorative sheet 27, it is not necessary to provide the surface of the subcase 26 with a colour or a pattern. The same transparent material as for the maincase 2 can be used to produce a lower part 28 and an upper part 29 of the subcase 26 of the second embodiment.

FIG. 10 shows a cross sectional view through the first embodiment. The decorative sheet 27 is inserted between the surface 18 of the subcase 28 and the inner surface of the maincase 2. The sheet 27 contacts the inner surface of the maincase 2.

In order to produce the thermometer according to the invention, the printed circuit board is first mounted in the subcase 17 or in the subcase 28. The wire 22 extends form the subcase 17 or from the subcase 28. The subcase 17 or the subcase 28 are inserted into the maincase 2, whereby the wire 22 is inserted through the probe portion 3 and through its open end. The wire 22 extending from the probe 3 is then welded to temperature sensor 5. The temperature 5 is attached, e.g. glued into tip 4. The tip 4 then is welded or glued to the end of the probe portion 3. The thermometer 1 is finally closed by connecting the closure 13 to the open end 14 of the maincase 2.

What is claimed is:

1. An electronic medical thermometer, comprising
    a maincase having an elongated probe portion with a tip,
    a temperature sensor arranged within said tip,
    a display element for displaying a temperature measured by said temperature sensor and
    an interior decorative member separate from said display element arranged within said maincase,
    wherein said maincase has a transparent display area, said display element is arranged behind said display area, and said maincase has at least one additional transparent or translucent area, said interior decorative member being arranged behind said additional transparent or translucent area such that at least a part of its surface is visible through said additional transparent or translucent area
    wherein said interior decorative member is provided with a viewing opening, the display element being visible through said viewing opening.

2. An electronic medical thermometer according to claim 1, wherein said maincase is transparent or translucent over substantially its entire surface.

3. An electronic medical thermometer according to claim 1, wherein said interior decorative member is formed by a sheet.

4. An electronic medical thermometer according to claim 1, wherein said interior decorative member has a colored and/or patterned surface visible through said additional transparent or translucent area.

5. An electronic medical thermometer according to claim 1, wherein such interior decorative member is formed as a subcase.

6. An electronic medical thermometer according to claim 5, wherein said subcase includes said display element.

7. An electronic medical thermometer according to claim 5, wherein said subcase is formed as a hollow body carrying an electronic circuit board connected to said temperature sensor and to said display element.

8. An electronic medical thermometer according to claim 7, wherein said subcase comprises an upper part and a lower part which are connected to each other and between which a hollow cavity is formed, in which said electronic circuit board is held.

9. An electronic medical thermometer according to claim 5, wherein said subcase has an opening for a wire connecting said temperature sensor to said electronic circuit board and/or an opening for an electric contact connecting said circuit board to power supply.

10. An electronic medical thermometer according to claim 1, wherein said maincase is closed with a closure member connected to an open end of said maincase.

11. An electronic medical thermometer according to claim 10, wherein said closure member is transparent.

12. An electronic medical thermometer according to claim 1, wherein said interior decorative member has a surface at least partly in contact with an inner surface of said maincase.

* * * * *